United States Patent [19]

Hair et al.

[11] Patent Number: 5,851,947
[45] Date of Patent: Dec. 22, 1998

[54] INCORPORATION OF NOBLE METALS INTO AEROGELS

[75] Inventors: Lucy M. Hair; Robert D. Sanner; Paul R. Coronado, all of Livermore, Calif.

[73] Assignee: The Regents of the University of California, Oakland, Calif.

[21] Appl. No.: 767,012

[22] Filed: Dec. 16, 1996

[51] Int. Cl.$^6$ ..................................................... B01J 23/38
[52] U.S. Cl. ........................... 502/258; 502/237; 502/238; 502/239; 502/242; 502/243; 502/246; 502/247; 502/261; 502/262; 502/263; 502/303; 502/304; 502/325; 502/326; 502/327; 502/330; 502/332; 502/333; 502/334; 502/339; 502/344; 502/346; 502/347; 502/348; 502/405
[58] Field of Search ............................... 501/12; 502/237, 502/242, 243, 246, 247, 258, 261, 262, 263, 325, 326, 327, 330, 332, 333, 334, 339, 303, 304, 344, 346, 347, 348, 405, 238, 239

[56] References Cited

U.S. PATENT DOCUMENTS

| | | | |
|---|---|---|---|
| 3,969,274 | 7/1976 | Frampton | 502/243 |
| 4,469,816 | 9/1984 | Armor et al. | 502/333 |
| 4,619,908 | 10/1986 | Cheng et al. | 502/350 |
| 4,622,310 | 11/1986 | Iacobucci | 502/213 |
| 4,717,708 | 1/1988 | Cheng et al. | 502/343 |
| 4,916,108 | 4/1990 | McLaughlin et al. | 502/325 |
| 5,306,555 | 4/1994 | Ramamurthi et al. | 428/289 |
| 5,409,683 | 4/1995 | Tillotson et al. | 423/338 |
| 5,538,931 | 7/1996 | Heinrichs et al. | 502/234 |

OTHER PUBLICATIONS

Chemical Abstract No. 104:75830, Armor et al, "Aerogels As Hydrogenation Catalysts", Appl. Catal. (1985) 19(2). No month.

Chemical Abstract No. 116:181940, Tsodikov et al, "Synthesis And Structure Of Silver Containing Silica Gel", Zh. Obshch, Khim (1991), 61(8). No Month.

Chemical Abstract No. 117:177332, Hoang–Van et al, "Alumina–Based Aerogels As Carriers For Automotive Palladium", J. Non–Cryst. Solids (1992), 145(1–3). No month.

Chemical Abstract No. 117:259096, Cauqui et al, "Preparation Of Rhodium Catalysts Dispersed On Titania–Silica Aerogels", J. Non–Cryst. Solids (1992), 147–148. No month.

Chemical Abstract No. 121:43832, Schneider et al, "High Surface Area Platinum Titania:Aerogels . . . Activity", J. Catal. (1994) 147(2). No month.

Chemical Abstract No. 121:118570, Schneider et al, "Preparation, Structural Properties . . . Palladium Titania:Aerogels", J. Catal. (1994) 148(2). No month.

Chemical Abstract No. 122:84259 which is an Abstract of European Patent Specification No. 629442 (Dec. 1994).

Chemical Abstract No. 122:9314, Calvino et al, "Microstructure And Catalytic Properties . . . $TiO_2$ –$SiO_2$ Aerogels", J. Sol–Gel. Sci. Technol. (1994) 2(1/2/3). No month.

Chemical Abstract No. 122:223784, Zou et al, "The Preparation Of High–Surface–Area $Pt/SiO_2$ Catalysts . . . Distributions", J. Catal. (1995), 152(2). No month.

Chemical Abstract No. 123:209740, Schnieder et al, "Novel Procedure . . . Palladium–Titania Aerogel", Stud. Sur. Sci. Catal. (1995) 91 (Preparation Of Catalysts VI). No month.

Chemical Abstract No. 126:93292, Martino et al, "Encapsulation Of Gold Nanoclusters In SIlica Materials . . . Synthesis", Chem. Mater. (1997), 9(2). no month.

JAPIO Patent Abstract No. JP404048932A which is an abstract of Japanese Patent Specification No. 4–048932 (1992). No month.

*Primary Examiner*—Anthony Green
*Attorney, Agent, or Firm*—L. E. Carnahan

[57] ABSTRACT

Aerogels or xerogels containing atomically dispersed noble metals for applications such environmental remediation. New noble metal precursors, such as Pt—Si or $Pd(Si—P)_2$, have been created to bridge the incompatibility between noble metals and oxygen, followed by their incorporation into the aerogel or xerogel through sol-gel chemistry and processing. Applications include oxidation of hydrocarbons and reduction of nitrogen oxide species, complete oxidation of volatile organic carbon species, oxidative membranes for photocatalysis and partial oxidation for synthetic applications.

19 Claims, No Drawings

INCORPORATION OF NOBLE METALS INTO AEROGELS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to inorganic aerogels or xerogels, particularly to inorganic aerogels and xerogels containing atomically dispersed noble metals, and more particularly to the formation of noble metal precursor to bridge noble metal and oxygen incompatibility followed by incorporation thereof into the aerogel or xerogel.

Effective catalysts require high surface areas, accessibility to the active site and a catalytic site(s) with exactly the right characteristics. These may include high dispersion of the active site, high to low activity, strong to weak interaction with the support and proximity to a second co-catalyst. Sol-gel chemistry and subsequent processing to inorganic xerogels or aerogels allows enormous flexibility in creating catalysts which incorporate the desired features.

The chemistry involved in synthesizing the catalyst permits the incorporation of the active site on an atomic level, leading to essentially 100% dispersion. The physical chemistry of the sol-gel leads to an inherently high surface area, high pore volume and transparent pre-catalyst system. The combined physics and chemistry involved in the drying maintains the transparency, textural properties and allows a wide range of forms to be created, including films, monoliths and powders.

Among the most active and stable catalysts for oxidation processes are the noble metals. Incorporation of noble metals on the atomic level could lead to homogenous-like reaction chemistry, insights into inherent catalytic activities and, ultimately, new approaches to partial and complete oxidation processes. Additionally, the high dispersion would result in much lower cost of the catalyst.

Due to the stable nature of the noble metals it is difficult to incorporate noble metals atomically into the oxide chemistry of the sol-gel materials, or, in fact, into any ceramic structure. This is because of the incompatibility between the noble metals and oxygen. Thus, it becomes necessary to "build a bridge" between the noble metal and the oxygen.

The present invention provides the needed bridge between the noble metals and oxygen, and involves the creation and synthesis of noble metal precursors which would react appropriately in the sol-gel chemistry and the subsequent incorporation of these precursors into the sol-gel. The thus produced inorganic aerogels and xerogels have been experimentally tested for performance in environmental applications.

SUMMARY OF THE INVENTION

An object of the present invention is to provide inorganic aerogels and xerogels containing atomically dispersed noble metals.

A further object of the invention is to provide a process which involves the creation and synthesis of noble metal precursors which react appropriately in sol-gel chemistry.

A further object of the invention is to provide a process by which noble metal precursors are incorporated into a sol-gel for producing aerogels or xerogels having atomically dispersed noble metals.

Another object of the invention is to provide noble metal precursors to bridge the incompatibility between noble metals and oxygen, whereafter such can be incorporated into inorganic aerogels or xerogels through sol-gel chemistry and processing.

Another object of the invention is to provide a process for the creation of inorganic aerogels or xerogels containing atomically dispersed noble metals incorporated through sol-gel chemistry.

Another object of the invention is the creation and synthesis of noble metal precursors capable of providing a bridge to the oxygen matrix.

Other objects and advantages of the invention will become apparent from the following description. Basically, the invention involves incorporation of noble metals into inorganic aerogels or xerogels. Due to the incompatibility between the noble metals and oxygen, the invention involves the creation of noble metal precursors to bridge this incompatibility, followed by these precursors being incorporated into the aerogel or xerogel through sol-gel chemistry and processing. The noble metals include Rh, Pd, Pt and Ir, and Ag and Au may also be included. The aerogels or xerogels may be composed of metal oxides such as silica, alumina, titania, vanadia, niobia, zirconia, tantala, or mixtures thereof. Tests have proven successful in the use of these materials in the treatment of exhaust from diesel or lean-burn engines and the treatment of volatile organic carbon species. Thus, these new aerogels and xerogels have application to environmental remediation as well as other applications involving catalysts.

DETAILED DESCRIPTION OF THE INVENTION

The invention involves the incorporation of noble metals into aerogels and xerogels. More specifically, the invention involves new inorganic aerogels and xerogels containing atomically dispersed noble metals which have been produced and tested for application to environmental remediation. The invention also involves the creation of new noble metal precursors to bridge the incompatibility between the noble metals and oxygen, followed by their incorporation into the inorganic aerogel or xerogel through sol-gel chemistry and processing. As set forth above, noble metals include Rh, Pd, Pt and Ir. Also, Ag and Au may be included. The inorganic aerogels or xerogels may be composed of any single or combination of mixed metal oxides, including but not limited to, silica, alumina, titania, vanadia, niobia, zirconia, tantala, and mixtures thereof.

Applications for these new inorganic aerogels or xerogels include, but are not limited to oxidation of hydrocarbons and reduction of nitrogen oxide species, complete oxidation of volatile organic carbon species, oxidative membranes for photocatalysis and partial oxidation for synthetic applications.

The invention involves two primary operations or processes: 1) the creation or formation of new noble metal precursors to bridge the incompatibility between the noble metals and oxygen, and 2) incorporation of the noble metal precursors into inorganic aerogel or xerogel through sol-gel chemistry and processing. These two primary operations are carried out utilizing operations set forth hereinafter as: 1) the preparation of reactants used in synthesis of precursors, 2) the preparation of precursors for aerogel synthesis, and 3) incorporation of the precursors into the sol-gel, which includes: 1) preparation of gels, and 2) drying of gels, to produce aerogels or xerogels containing atomically dispersed noble metals.

Preparation Of Reactants Used In Synthesis Of Precursors:

I. Preparation Of $(PhCN)_2PtCl_2$

Place 4.0 g (25 mmol) of $PtCl_2$ into a 250 mL 3-neck flask. Add 100 mL benzonitrile and heat to 110° C. Use one neck of flask for thermometer, one neck for condenser. When all (or most) solids dissolve, filter hot solution. Cool in freezer overnight; collect 4.7 g of yellow microcrystalline product (sometimes comes out powdery) by filtration. Wash with 3×20 mL portions of pet ether. Filter washes directly into filtrate solution. Add 60 mL additional pet ether to this suspension and cool in freezer again overnight to get a second crop of 1.3 g. Total yield was 85%.

II. Preparation Of $(PhCN)_2PdCl_2$

Place 5.0 g (28 mmol) of $PdCl_2$ into a 250 mL 3-neck flask. Add 125 mL benzonitrile and heat to 110° C. Use one neck of flask for thermometer, one neck for condenser. When all (or most) solids dissolve, filter hot solution. Cool in freezer overnight; collect 9.2 g of orange microcrystalline product by filtration. Wash with 3×25 mL portions of pet ether. Filter washes directly into filtrate solution. Add 75 mL additional pet ether to this suspension and cool in freezer again overnight to get a second crop of 0.1 g.

Preparation Of Precursor For Aerogel Synthesis

I. Preparation Of $(PhCN)_2Pt[(OMe)_3Si(CH_2)_3NHCH_2CH_2NH_2]Cl_2$ [Shorthand: Pt(Si—N—N) or Pt—Si]

This reaction can either be run in the glovebox or under a nitrogen purge. It is not especially air-sensitive, though, and so can just bubble nitrogen into the solution through a disposable pipette. Make a suspension of 0.75 g (1.59 mmol) of $(PhCN)_2PtCl_2$ in 25 mL of nitrogen-purged benzene in a 50 mL round-bottom flask. Make up a solution of 0.36 g (1.59 mmol) of $(OMe)_3Si(CH_2)_3NHCH_2CH_2NH_2$ in 10 mL of benzene and add this dropwise (using a disposable pipette) to the Pt/benzene suspension under a nitrogen purge. As soon as most of the suspension dissolves to form a yellow solution (this happens within five minutes), quickly filter the solution (in air) and pump off the benzene from the filtrate on a vacuum line. Wash the residue that remains after the benzene removal with several portions of petroleum ether. This removes any remaining benzonitrile and benzene. After each wash, decant off the washings and discard. It usually requires 3–5 washing to obtain a nice solid product. Pump off any remaining pet ether on a vacuum line. Total yield is 1.0 g of yellow crystalline product.

II. Preparation Of $(PhCN)_2Pt[(OMe)_3Si(CH_2)_3NHCH_2CH_2NH_2]_3Cl_2$ [Shorthand: Pt(Si—N—N)$_3$]

This procedure is essentially the same as above for $(PhCN)_2Pt[(OMe)_3Si(CH_2)_3NHCH_2CH_2NH_2]Cl_2$. The only difference is in the ratio of $(PhCN)_2PtCl_2$ to $(OMe)_3Si(CH_2)_3NHCH_2CH_2NH_2$. In a typical procedure, use 0.50 g (1.06 mmol) of $(PhCN)_2PtCl_2$ and 0.75 g (3.38 mmol) of $(OMe)_3Si(CH_2)_3NHCH_2CH_2NH_2$. The $(PhCN)_2PtCl_2$ suspension was made up in 20 mL of benzene and the $(OMe)_3Si(CH_2)_3NHCH_2CH_2NH_2$ solution was made up in 10 mL benzene. 1.1 g of off-white powdery product is obtained.

III. Preparation Of $Pt[OEt)_3Si(CH_2)_2PPh_2]_2Cl_2$ [Shorthand: Pt(Si—P)$_2$]

This reaction is run under a nitrogen purge. A suspension of 1.75 g (3.71 mmol) of $(PhCN)_2PtCl_2$ is made up in 50 mL of nitrogen-purged benzene. A solution of 2.86 g (7.61 mmol) of $(OEt)_3Si(CH_2)_2PPh_2$ in 10 mL benzene is added dropwise to the Pt suspension. As soon as the suspension dissolves to form a yellow solution (this happens within five minutes), quickly filter the solution in air and pump off the benzene on a vacuum line. Wash the residue that remains after benzene removal several times with petroleum ether. Decant off the pet ether after each washing. The residue should be washed until it is no longer "sticky". This usually requires 3–5 washings to obtain a nice solid product. Pump off any remaining pet ether on a vacuum line. A typical procedure will yield 2.75 g of yellow product.

IV. Preparation Of $Pd[(OEt)_3Si(CH_2)_2PPH_2]_2Cl_2$ [Shorthand: Pd(Si—P)2]

The procedure is essentially the same as described above for $Pt[(OEt)_3Si(CH_2)_2PPh_2]_2Cl_2$. In a typical procedure 0.50 g (1.31 mmol) $(PhCN)_2PdCl_2$ in 25 mL benzene and 1.08 g (2.87 mmol) $(OEt)_3Si(CH_2)_2PPh_2$ in 5 mL benzene was used to yield 1.10 g of light yellow product. During the reaction, the solution changes from root-beer colored to yellow-brown to bright yellow.

V. Preparation Of $Pd[(OMe)_3Si(CH_2)_3NH_2]_2Cl_2$ [Shorthand: Pd(Si—N)$_2$]

This reaction is run under a nitrogen purge. A suspension of 0.40 g (1.04 mmol) of $(PhCN)_2PdCl_2$ is made up in 20 mL of nitrogen-purged benzene. A solution of 0.41 g (2.29 mmol) Of $(OMe)_3Si(CH_2)_3NH_2$ in 5 mL benzene is added dropwise to the Pd suspension. As soon as the suspension dissolves to form a yellow solution (this happens within five minutes), quickly filter the solution in air and pump off the benzene on a vacuum line. Wash the residue that remains after benzene removal several times with petroleum ether. Decant off the pet ether after each washing. The residue should be washed until it is no longer "sticky". This usually requires 3–5 washings to obtain a nice solid product. Pump off any remaining pet ether on a vacuum line. A typical procedure will yield 0.50 g of yellow product.

Incorporation Of The Precursors Into Aerogels Or Xerogels Through Sol-Gel Chemistry And Processing The incorporation of the precursors into aerogels or xerogels involves two operations: 1) preparation of the gels, and 2) drying of the gels, these operations being exemplified as follows:

I. Preparation Of Gels

EXAMPLE 1

(95EM20): Pt(P2)/Ceria-Titania Aerogel Catalyst

A solution of 9 g titanium ethoxide and 0.3 g Pt(P2) precursor in 107 mls ethanol is prepared. A second solution containing 1.54 g cerium nitrate, 5 g water, 10 drops of concentrated nitric acid and 25 mls ethanol is also mixed. The second solution is then added to the first solution. Gelation takes place in about two hours.

EXAMPLE 2

(95EM16): Pd(Pl)Pt(Si3)/Ceria-Titania Aerogel Catalyst

A solution of 9 g titanium ethoxide and 0.01 g Pt(Si3) precursor in 57 mls ethanol is prepared. A second solution containing 0.3 g (Pd(Pl), 1.00 g cerium nitrate and 50 mls ethanol is also mixed. The second solution is then mixed with the first. A third solution containing 5.0 g water, 10 drops concentrated nitric acid and 25 mls ethanol is mixed and then added to the first two. Gelation takes place in three to four hours.

All solutions and gelation are performed at room temperature under ambient air. The alkoxide and metal precursors are stored in dry, oxygen-free glove box.

II. Drying Of Gels

Method 1

Gels were placed in a porous container which could be stainless steel or ceramic. At all times, the gel must remain immersed in ethanol. They are then placed into the Parr bomb, which is sealed and cooled to 10° C. Liquid carbon dioxide is flowed into the Parr bomb at 900 psi and 10° C. and allowed to exchange with the ethanol contained in the gels. The exchange fluid is then drained and inspected for residual ethanol. Initial exchanges and refilling with pure carbon dioxide take place every half to one hour. After the first day, exchange frequency is dropped to approximately every three to four hours. When no more ethanol is detected in the residual exchange fluid, exchange is deemed complete; this usually requires three to four days. At that time, the temperature and pressure are slowly elevated to above the critical point of carbon dioxide, which is 31° C. and 1075 psi. Typically, operating conditions are up to 50° C. and 1500 psi. When the critical point has been attained for at least one-half hour, the pressure is slowly released over a period of a few hours and the aerogel obtained.

Method 2

The Rapid SuperCritical Extractor (patent applied for by LLNL in other projects):

Gelling solution is poured into a mold and sealed. The sealed mold is placed into a pressure fixture and slid into the pressure secondary. The temperature of the sample is taken above the critical point of carbon dioxide, up to 65° C. and the pressure increased with a pump. Then supercritical carbon dioxide is introduced and, essentially, pushed through the sample. Removal of ethanol is complete within one and-a-half to two hours. Pressure and temperature are slowly reduced and the finished aerogel obtained within another hour.

It has thus been shown that the present invention provides new inorganic aerogels or xerogels containing atomically dispersed noble metals, this being accomplished by new noble metal precursors to bridge the incompatibility between the noble metals and oxygen, followed by incorporation of these precursors into the aerogel or xerogel through sol-gel chemistry and processing. The inorganic aerogels or xerogels may be composed of any single or combination of mixed metal oxides, including but not limited to silica, titania, vanadia, niobia, zirconia, tantala, ceria, 1 anthana, and mixtures thereof, with the noble metals including rhodium (Rh), palladium (Pd), platinum (Pt), and iridium (Ir), as well as silver (Ag) and gold (Au). Also, other precursors may be used, such as $Pt(Si-N-N)_3$, $Pd(Si-N)$, and $Pd(Si-N)_3$. These new inorganic aerogels and xerogels may be utilized, for example, for oxidation of hydrocarbons and reduction of nitrogen oxide species, complete oxidation of volatile organic carbon species, oxidative membranes for photocatalysis and partial oxidation for synthetic applications.

While specific examples of the operational sequences for carrying out the invention, and specific materials and parameters have been set forth to exemplify and explain the principles of the invention, such are not intended to be limiting. Modifications and changes may become apparent to those skilled in the art, and it is intended that the invention be limited only by the scope of the appended claims.

The invention claimed is:

1. An inorganic aerogel containing at least one atomically dispersed noble metal.

2. The inorganic aerogel of claim 1, wherein the noble metal is selected from the group consisting of Rh, Pd, Pt, Ir, Ag, and Au.

3. The inorganic aerogel of claim 1, composed of any single or combination of mixed metal oxides selected from the group consisting of silica, alumina, titania, vanadia, niobia, zirconia, tantala, ceria, lanthana, and mixtures thereof.

4. The inorganic aerogel of claim 1, produced by a method comprising:

forming a noble metal precursor to bridge an incompatibility between the noble metal and oxygen, and incorporation of the thus formed precursor into the aerogel using sol-gel chemistry and processing.

5. The inorganic aerogel of claim 4, wherein forming the precursor is carried out by preparing reactants for use in synthesis of the precursor, and preparing the precursor for aerogel synthesis.

6. The inorganic aerogel of claim 5, wherein preparing the reactants is carried out by preparation of material selected from the group consisting of $(PhCN)_2PtCl_2$ and $(PhCN)_2PdCl_2$.

7. The inorganic aerogel of claim 5, wherein preparing the precursors for aerogel synthesis is carried out by preparation of a precursor selected from the group of $Pt(Si-N-N)$, $Pt(Si-N-N)_3$, $Pt(Si-P)_2$, $Pd(Si-P)_2$, $Pt(Si-N-N)_3$, $Pd(Si-N)$, $Pd(Si-N)_3$ and $Pd(Si-N)_2$.

8. The inorganic aerogel of claim 4, wherein incorporation of the precursor into the aerogel includes:

preparing a gel; and drying the gel.

9. The inorganic aerogel of claim 8, wherein preparing the gel is carried out at room temperature under ambient air.

10. The inorganic aerogel of claim 8, wherein the prepared gel is selected from the group consisting of Pt(P2)/Ceria-Titania aerogel catalyst, and Pd(P1)Pt (Si$_3$)/Ceria-Titania aerogel catalyst.

11. The inorganic aerogel of claim 8, wherein drying the gels is carried out in a rapid super-critical extractor.

12. A method for atomically dispersing noble metals into an aerogel or xerogel, comprising:

forming noble metal precursors wherein a bridge is formed between the noble metal and oxygen; and incorporating the thus formed precursors into the aerogel or xerogel.

13. The method of claim 12, wherein incorporating the precursors into the aerogel or xerogel is carried out using sol-gel chemistry and processing.

14. The method of claim 12, wherein the forming of noble metal precursors includes preparation of reactants used in synthesis of the precursors, and preparation of the precursors for aerogel synthesis.

15. The method of claim 14, wherein preparation of the reactants is carried out by preparation of reactants selected from the group of $(PhCN)_2$, $PtCl_2$, $(PhCN)_2PtCl_2$, and $(PhCN)_2PdCl_2$.

16. The method of claim 14, wherein preparation of the precursors for aerogel synthesis is carried out by preparation of precursor selected from the group of $Pt(Si-N-N)$, $Pt(Si-N-N)_3$, $Pt(Si-P)_2$, $Pd(Si-P)_2$, $Pt(Si-N-N)_3$, $Pd(Si-N)$, $Pd(Si-N)_3$, and $Pd(Si-N)_2$.

17. The method of claim 12, wherein incorporating the precursors into the aerogel or xerogel is carried out by preparing a gel, and drying the gel.

18. The method of claim 17, wherein the gel is selected from the group consisting of Pt(P2)/ceria-titania and Pd(P1)Pt(Si3)/ceria-titania.

19. The method of claim 17, wherein the gel is dried by rapid supercritical extraction.

* * * * *